Figures 1, 2:
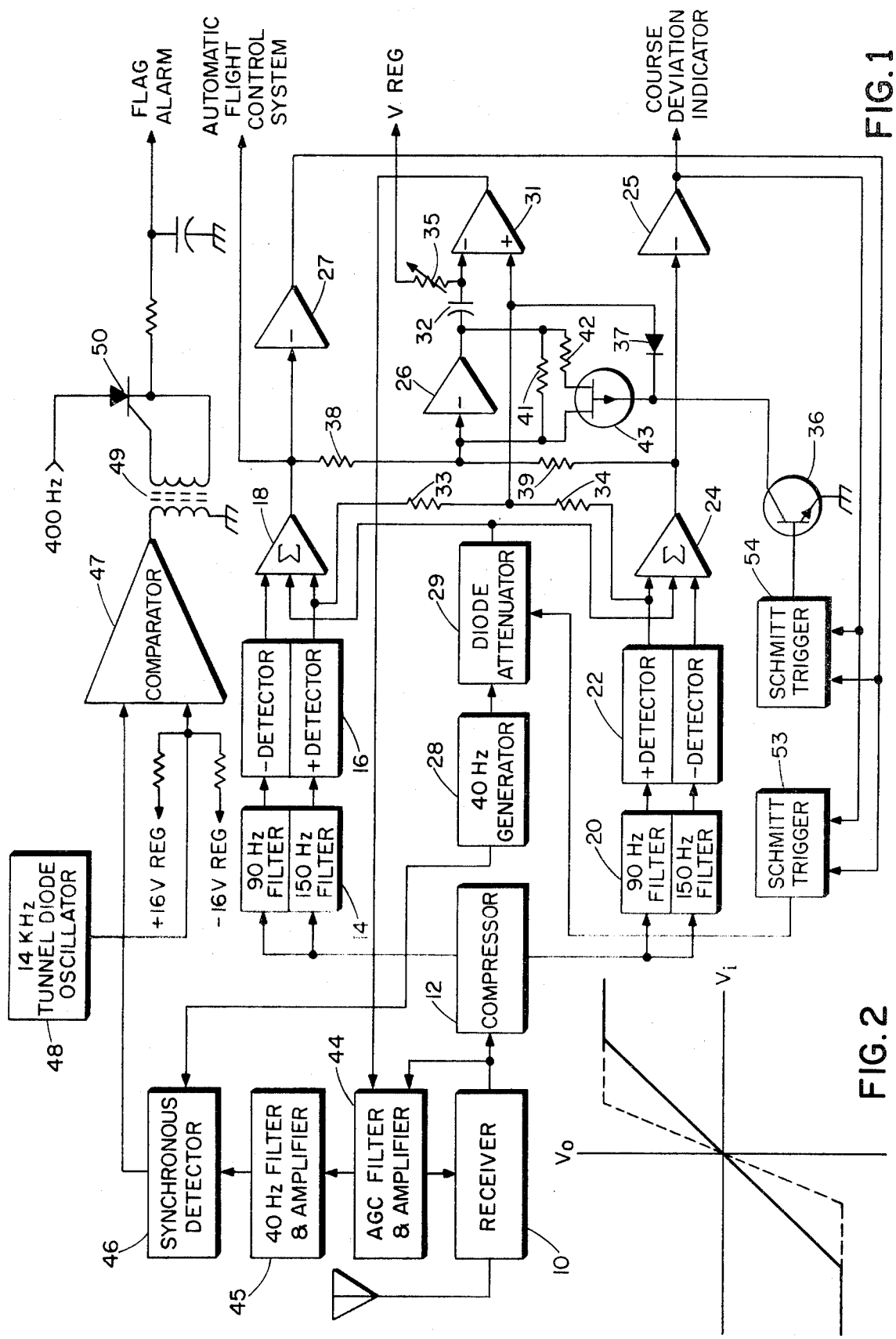

United States Patent [19]

Sawicki et al.

[11] 3,750,176

[45] July 31, 1973

[54] INTEGRITY MONITOR FOR ILS RECEIVER WITH AUTOMATIC CHANGE OF MONITOR THRESHOLD SENSITIVITY

[75] Inventors: Joseph J. Sawicki, Lighthouse Point; John A. Sharrow, Fort Lauderdale, both of Fla.

[73] Assignee: The Bendix Corporation, Southfield, Mich.

[22] Filed: Oct. 5, 1971

[21] Appl. No.: 186,745

[52] U.S. Cl. ............... 343/107, 325/363, 325/407, 343/109
[51] Int. Cl. ............................................ G01s 1/14
[58] Field of Search ............... 343/107, 108 R, 109; 325/363, 407

[56] References Cited
UNITED STATES PATENTS

| | | | |
|---|---|---|---|
| 3,382,498 | 5/1968 | Mouradian | 343/108 R |
| 2,890,442 | 6/1959 | Glenny et al. | 343/107 |
| 3,308,466 | 3/1967 | Benjamin | 343/108 R |

*Primary Examiner*—Samuel Feinberg
*Assistant Examiner*—Denis H. McCabe
*Attorney*—Bruce L. Lamb et al.

[57] ABSTRACT

An integrity monitor for an aircraft Instrument Landing System receiver in which malfunctions are detected by comparing the outputs of identical guidance signal channels. Tracer signals are injected to prevent total guidance channel failure from being mistaken as a valid condition. Automatic means adjust comparison tolerances to permit a greater difference in guidance channel outputs without alarm when the aircraft is in the clearance area and to reduce the permissible difference when the aircraft is on-course.

8 Claims, 2 Drawing Figures

INTEGRITY MONITOR FOR ILS RECEIVER WITH AUTOMATIC CHANGE OF MONITOR THRESHOLD SENSITIVITY

The present invention relates to an integrity monitor for an aircraft ILS navigation receiver. More particularly, it relates to an integrity monitor having automatic means for varying the monitor threshold sensitivity whereby tight tolerances for the monitor are maintained whenever the aircraft is on-course and whereby the tolerances are relaxed when the aircraft is operating in the ILS clearance area.

U.S. Pat. No. 3,389,392 entitled "Integrity Monitor ILS Navigation Receiver" by R. L. Stauffer et al. discloses a monitoring system in which two substantially identical guidance channels are provided. Each channel includes the standard 90/150 Hz filters and detectors. The outputs of each channel should be equal in an ideally functioning receiver, and consequently the difference therebetween should be zero. This difference is monitored by means which include a provision for injecting and following through a tracer signal to guard against the undiscovered failure of the monitoring means. Because of circuit differences, signal transients and the like, the difference between channels will never be constantly zero even in a normally functioning system. It is, therefore, necessary that some tolerance be established in the difference within which the system is regarded as operating normally and beyond which the system is deemed to have failed. In the prior Stauffer et al. system this tolerance was established at ±150 millivolts. Such a tolerance is adequate for landing under Category I and II conditions. For Category III conditions, however, this tolerance must be tightened to ±50 millivolts for on-course flight. Such a close tolerance cannot be maintained during the entire approach and landing of the aircraft. When flying in the clearance area approaching the localizer or glide slope course, numerous false alarms will result, thereby causing the pilot to lose confidence in the system.

Accordingly, it is an object of the present invention to provide integrity monitoring means for aircraft ILS receivers in which the monitoring threshold or tolerance is relaxed to an amount sufficient to warn against system failures when the aircraft is flying in the clearance area and which automatically lowers those thresholds, or tightens the tolerance, when the aircraft is flying on-course.

Tighter tolerances are necessary under on-course flight, not only to provide increased confidence in the airborne equipment, but to warn against failure or anomalies of the ground based transmitting equipment. It is, therefore, another object of the invention to provide a monitoring system capable of detecting increases or decreases beyond allowable limits in the sensitivity of the airborne equipment. Such changes might result from faults in the ground based equipment.

An additional object of the invention is to provide a monitoring system which, in addition to the above-mentioned features, further provides means for detecting short-circuits on the lines conducting the guidance signal, which is the useful ILS receiver output, to the automatic flight control system of the aircraft and to the deviation indicator which the pilot follows during manual landings.

Still another object of the invention is to provide a monitoring system which will include within its functions means for testing the AGC circuit of the receiver, thereby providing warning of internal faults within the receiver.

Briefly, the invention comprises an ILS receiver having dual 90/150 Hz filters and detectors constituting separate channels, one of which is designated the control system channel and the other of which is designated the deviation indicator channel. The difference between the detected 90/150 Hz tones is obtained in each channel, and this difference serves in the control system channel as the input to the flight control system and in the indicator channel as the input to the deviation indicator. The guidance signal output of each channel is combined with a 40 Hz tracer signal of controlled amplitude, amplified, and then compared with the other channel. Ideally, this comparison should produce only a double amplitude tracer signal since the control system and deviation channel output signals should be equal. The comparator is an amplifier-limiter having a gain switchable between two constant values. The gain of the amplifier-limiter is maintained at a low value when the aircraft is flying in the clearance area and is switched to a higher value when the aircraft is flying on-course. The limiter action is such that if the magnitude of the difference between signals from the separate channels increases a specified amount, the tracer signal will disappear from its output. The output is a.c. coupled to another amplifier-limiter which, by similar action, causes loss of the tracer if the sensitivity changes a specified amount. The output of this second amplifier-limiter is fed into the receiver AGC system for the purpose of monitoring the AGC amplifier and filter for failures which might otherwise cause undetected errors. The tracer signal is taken from the AGC amplifier output, amplified, filtered, and synchronously detected so as to distinguish the tracer signal from noise of like frequency. The synchronously detected tracer signal is passed through a third amplifier-limiter which is capable of detecting changes in the tracer amplitude beyond tolerance amounts. As long as tracer amplitude at this point remains within specified limits flag alarms will be obscured, and the system may be relied upon as being properly operative. When flying on-course, the tracer amplitude will be driven beyond limits upon the occurrence of any of the following events:

a. a change in sensitivity in excess of + 50 percent or −30 percent;

b. a difference between the outputs of the control system and deviation channels greater than ± 50 millivolts;

c. the occurrence of a short-circuit on either of the lines conducting signal to the aircraft control system or the deviation indicator;

d. the occurrence of an internal failure in any of the monitoring circuits.

When flying in the clearance area, the failure alarms will be triggered by the same events as preceding except that an alarm will appear only upon decrease in sensitivity beyond −30 percent and no alarm will be given for increase in sensitivity, and the tolerance upon the magnitude of the difference between control system and deviation channel outputs is relaxed to ± 150 millivolts. A change in conditions under which the system will alarm is accomplished by a Schmitt trigger circuit which responds to the level of the guidance signal as a means for determining whether the aircraft is in the clearnace area or on-course.

In the drawings:

FIG. 1 is a functional block diagram of the monitoring system of the invention; and FIG. 2 is a chart showing the transfer characteristic of an amplifier-limiter circuit used in the invention.

Referring to FIG. 1, the standard instrument landing system comprises two superheterodyne receivers, one of which is tuned to the frequency of the localizer carrier and the other of which is tuned to the frequency of the glide slope carrier. Only one receiver 10 is shown, which may be either the localizer or glide slope receiver, since the invention appears in the same form in both the localizer and glide slope channels. The audio output of the receiver is applied to a compressor 12 which limits the output to a maximum value. The output of the compressor is then applied to 90 Hz and 150 Hz filters 14 in the control system channel which are followed by detectors 16, respectively negatively and positively poled. The direct current outputs of detectors 16 are added in a summing amplifier 18 to provide a guidance signal output for the aircraft automatic flight control system. Filters 20, detectors 22 and summing amplifier 24 in the deviation indicator channel are identical to corresponding elements in the control system channel except that detectors 22 are connected with opposite polarity from detectors 16 so that the output of amplifier 24 is of the opposite sense from the output of amplifier 18. The output of amplifier 24 is, therefore, inverted in amplifier 25 prior to utilization in the deviation indicator so that both the guidance signal to the control system and the signal to the deviation indicator will be of the same sense.

The outputs of amplifiers 18 and 24 are added in summing resistors 38 and 39 and fed to amplifier 26. The direct current output of amplifier 26 will be zero for an ideally operating system since the direct current outputs of amplifiers 18 and 24 are then equal but of opposite sense. An additional input in the form of a 40 Hz tracer signal is applied to each of the amplifiers 18 and 24. This tracer signal originates in a 40 Hz generator 28, the output of which is passed through a switchable attenuator 29 prior to injection in amplifiers 18 and 24. The ideal condition of the output of amplifier 26, therefore, comprises a signal having zero d.c. component and an a.c. tracer component having nominally twice the amplitude of the tracer signal injected into each of the amplifiers 18 and 24. Should a fault arise in either the control system or deviation indicator channel, the a.c. output of amplifier 18 or 24 will be lost. As a result, the a.c. output of amplifier 26 will be half its normal amplitude, triggering the flag alarm as explained more fully hereinafter. A short circuit on either or both utilization outputs will cause a similar condition and result. Amplifier-limiter 26 suitably comprises an operational amplifier connected with feedback resistors 41 and 42 and having a limiting transfer characteristic, as shown in FIG. 2. Resistors 41 and 42 are connected in parallel during flight in the clearance area by means of an FET switch 43. When on-course, switch 43 is opened effectively increasing the feedback impedance of the amplifier to equal the value of resistor 41 and thereby increasing the amplifier gain by a factor equal to the ratio of feedback impedance with switch 43 open to that with switch 43 closed.

FIG. 2 illustrates these two gain conditions, the low gain being represented by the solid line, and the high gain being shown by the dashed line. Under ideal conditions, the a.c. tracer component will be amplified along the linear portion of the transfer characteristic. Whenever an out-of-tolerance difference between signal from the control system channel and the deviation indicator channel appears, the direct current component in the signal is sufficient to cause the operating point of amplifier 26 to shift away from the linear portion of the transfer characteristic and beyond the knee thereof to the saturated region. When saturated, or limited, the a.c. signal will no longer be amplified and consequently tracer signal will disappear from the output of amplifier 26. Disappearance of this tracer triggers the failure alarm, as will shortly be described.

The a.c. output of amplifier 26 is connected as one input to an amplifier-limiter 31 through capacitor 32. Other inputs to amplifier-limiter 31 are connected from the positively poled detector 16 of 150 Hz signal in the control system channel through resistor 33 and from the positively poled detector 22 of 90 Hz signal in the deviation indicator channel through resistor 34. Finally, a direct bias voltage is applied from a reference voltage source through variable resistor 35. The inputs through resistors 33, 34 and 35 are for the purpose of determining out-of-tolerance changes in sensitivity. When operating in the clearance area, these inputs are partially disabled so as to respond only to out-of-tolerance decreases in sensitivity and not to increases thereof. This action is accomplished by transistor 36 and diode 37, to which reference will again be made later.

The output of amplifier 31 is injected into the AGC amplifier 44. The tracer signal is recovered from the output of AGC amplifier 44, passed through 40 Hz amplifier/filter 45, and conducted to a detector 46 which operates synchronously with signal from tracer generator 28. Detection in this manner produces a direct current output for tracer comparator 47 which is not influenced by extraneous signals having frequencies at or near 40 Hz. The detected tracer signal from detector 46 together with a direct bias voltage are applied as inputs to tracer comparator 47. Also applied are inputs from the power supply regulators, thus monitoring these voltages, and a 14 kHz a.c. signal from tunnel diode oscillator 48. Comparator 47 has a transfer characteristic similar to that shown in FIG. 2 so that an out-of-tolerance increase or decrease in the level of detected tracer signal output from detector 46 will cause the comparator to saturate and no longer conduct therethrough the undetected 14 kHz signal applied at its input. Comparator 47 is followed by a pulse transformer 49 which will pass the 14 kHz a.c. tracer signal but not the d.c. component of the comparator output. The output of pulse transformer 49 triggers SCR 50, which is powered from a 400 Hz source, resulting in a d.c. voltage at the flag alarm output, indicating a valid condition. Should tracer signal disappear anywhere within the circuit, SCR 50 becomes disabled thereby causing the failure alarm to appear. As noted above, among the causes of disappearance of tracer signal are out-of-tolerance changes in sensitivity and out-of-tolerance differences between the magnitudes of the guidance signal outputs of the control system and deviation indicator channels. These tolerances are relaxed when flying in the clearance area and tightened when flying on-course by the following means.

Schmitt triggers 53 and 54 each receive trigger inputs from amplifiers 25 and 27 thereby providing rectified trigger signals not dependent upon the sense of the guidance error. Trigger 54 is set to trigger on whenever the level of guidance signal constituting the trigger signal input thereto corresponds to a signal level only obtained when the aircraft is flying in the clearance area. Trigger 53 is set to trigger whenever the level of the guidance signal constituting its trigger input drops below a level corresponding to near on-course position of the aircraft. Trigger 54 (operable in the clearance area) renders transistor 36 and FET 43 conductive. Conduction of FET 43 reduces the gain of amplifier-limiter 26 and thereby enlarges the tolerable difference between guidance signals from the control system and deviation indicator channels. Conduction of transistor 36 removes the tolerance on increase in system sensitivity since the voltage at the anode of diode 37 cannot go positive an amount greater than the sum of the offset voltage of diode 37 and the collector-emitter junction voltage of transistor 36; and hence, the inputs combined at this point cannot swing the amplifier into positive saturation. However, should the inputs on resistors 33 or 34 drop below the negative bias voltage on resistor 35, the negative bias voltage can shift the amplifier operating point towards the negative saturation point; and if the decrease is beyond tolerance, the bias on resistor 35 is sufficient to drive amplifier 31 into negative saturation.

During the time trigger 54 is operative, trigger 53, which controls diode attenuator 29, is inoperative. In the clearance area, attenuator 29 is switched off causing the tracer signal to be applied to amplifiers 18 and 24 at a high level. This is desirable since at this time trigger 54 has caused the gain of amplifier 26 to be reduced, so it is necessary to increase tracer input amplitude to maintain substantially constant tracer output amplitude at comparator 47.

When on-course, trigger 54 is inoperative and trigger 53 is operative. This causes FET 43 and transistor 36 to become nonconductive and attenuator 29 to switch on. The gain of amplifier 26 is then at a higher value, the amplitude of tracer input to amplifiers 18 and 24 is reduced, and diode 37 is effectively disconnected from the junction of resistors 33, 34 and 35, thereby permitting the voltage at the junction to go positive and causing amplifier 31 to shift into positive saturation should the sensitivity of the system increase an excessive amount.

The invention claimed is:

1. An integrity monitor for detecting faults in the airborne equipment of an aircraft radio navigation system, comprising a radio receiver for receiving beamed radio transmissions defining an aircraft course in space;

means associated with said receiver producing a guidance signal output having a magnitude and sense dependent upon the displacement of said receiver from said defined course;

duplicate means associated with said receiver normally producing a guidance signal which is the substantial duplicate of the guidance signal produced by said first named means;

means for injecting a tracer signal in each of said guidance signal producing means;

means at the outputs of said guidance signal producing means for comparing with one another said guidance signals each including said tracer signal to determine the difference between said guidance signals and the sum of said included tracer signals;

means including a variable gain limiting amplifier receiving the output of said comparing means and producing tracer signal at the output thereof so long as said guidance signal difference is insufficient in magnitude to cause limiting of said amplifier;

means responsive to the magnitude of one of said guidance signals for varying the gain of said amplifier; and means for producing an alarm whenever magnitude of tracer signal from said amplifier varies a predetermined amount.

2. An integrity monitor as claimed in claim 1 with additionally, means controlled by said means for varying said amplifier gain for adjusting the magnitude of said tracer signal.

3. In a navigation receiver for an aircraft instrument landing system having dual means for detecting tone modulations on a radio beam to provide two normally similar guidance signals, an integrity monitor comprising means for combining with each of said guidance signals an alternating current tracer signal;

means for comparing said combined tracer-guidance signals with one another, said comparing means under normal conditions yielding a second tracer signal having an amplitude proportional to the sum of the amplitudes of said tracer signals, a variable gain amplifier for amplifying said second tracer signal;

means controlling the gain of said amplifier to provide amplification in a greater amount whenever the magnitude of one of said guidance signals indicates that the aircraft bearing said receiver is relatively close to the desired course than when said magnitude indicates that said aircraft is relatively distant from the desired course;

detecting means providing a direct voltage proportional to the amplitude of said amplified second tracer signal; and means for comparing said direct voltage with an established reference for producing an alarm whenever said direct voltage differs from said reference an appreciable amount.

4. An integrity monitor as claimed in claim 3, with additionally, means also controlled by said means controlling said amplifier gain for attenuating said tracer signals combined with said guidance signals whenever said amplifier gain is adjusted for greater amplification.

5. An integrity monitor as claimed in claim 4 wherein said amplifier includes limiting means and with additionally, means responsive to the signal levels of said modulations on said beam for biasing said limiting means into a condition of nonconduction of alternating current whenever said modulation signal levels change an intolerable amount.

6. An integrity monitor as claimed in claim 5, with additionally, means also controlled by said means controlling said amplifier gain for disabling said biasing means in the presence of increasing signal levels of said modulations whenever said amplifier gain is adjusted for lesser amplification.

7. In a navigation receiver for an aircraft instrument landing system having dual means for detecting tone modulations on a radio beam to provide two normally similar guidance signals, an integrity monitor comprising, a signal generator producing an alternating current tracer signal;

controllable means for adjusting the level of said tracer signal at a relatively high and at a relatively low level;

means for combining said controlled level tracer signal with each of said guidance signals;

means for comparing said combined tracer-guidance signals with one another, said comparing means under normal conditions yielding a second tracer signal having an amplitude proportional to the sum of the amplitudes of the tracer signal components of said combined tracer-guidance signals;

an amplifier having a controllable gain for amplifying said second tracer signal a relatively high amount in one gain control condition and a relatively low amount in another gain control condition;

control means for controlling the gain of said amplifier and said level adjusting means to provide relatively low level tracer signal when said amplifier is controlled for relatively high amplification and to provide relatively high level tracer signal when said amplifier is controlled for relatively low amplification, said control means being responsive to said guidance signals to provide high gain-low level controls when the aircraft is relatively close to the desired course and to provide low gain-high level controls when the aircraft is relatively distant from the desired course;

a limiting-type amplifier having as inputs a reference signal, the output of said controlled gain amplifier and a signal proportional to the levels of said guidance signals;

detecting means providing a direct voltage proportional to the amplitude of the alternating current output of said limiting amplifier; and means for comparing said direct voltage with a second reference for producing an alarm whenever said direct voltage differs from said reference an appreciable amount.

8. An integrity monitor as claimed in claim 7 wherein said detecting means operates in synchronism with said tracer signal generator.

* * * * *